(12) United States Patent
Bloodworth et al.

(10) Patent No.: US 7,133,234 B2
(45) Date of Patent: Nov. 7, 2006

(54) HARD DISK DRIVE PREAMPLIFIER WRITE DRIVER

(75) Inventors: Bryan E. Bloodworth, Irving, TX (US); Thomas Cougar Van Eaton, Wylie, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/614,993

(22) Filed: Jul. 8, 2003

(65) Prior Publication Data

US 2005/0007686 A1 Jan. 13, 2005

(51) Int. Cl.
*G11B 5/02* (2006.01)
*G11B 5/09* (2006.01)

(52) U.S. Cl. .......................... 360/68; 360/46
(58) Field of Classification Search .................. 360/46, 360/67, 68
See application file for complete search history.

(56) References Cited

U.S. PATENT DOCUMENTS

| | | | |
|---|---|---|---|
| 5,668,676 A * | 9/1997 | Voorman et al. ............... | 360/46 |
| 5,790,336 A | 8/1998 | Voorman et al. | |
| 5,841,603 A * | 11/1998 | Ramalho et al. ............... | 360/68 |
| 6,175,463 B1 * | 1/2001 | Nayebi et al. ................. | 360/68 |
| 6,246,533 B1 | 6/2001 | Davis et al. | |
| 6,285,221 B1 * | 9/2001 | Leighton et al. ............ | 327/110 |
| 2002/0054445 A1 | 5/2002 | Chaiken et al. | |

FOREIGN PATENT DOCUMENTS

| | | |
|---|---|---|
| EP | 0 720 151 A2 | 7/1996 |
| EP | 1 187 102 A2 | 3/2002 |

* cited by examiner

*Primary Examiner*—Wayne Young
*Assistant Examiner*—Daniell L. Negrón
(74) *Attorney, Agent, or Firm*—W. James Brady, III; Frederick J. Telecky, Jr.

(57) ABSTRACT

The present invention discloses an apparatus (160) comprising a common mode generator circuit (162) coupled to a current directing circuit adapted to provide current to a first write head connection node (170) and to a second write head connection node (172). The common mode generator circuit (162) is adapted to provide additional current to the first write head connection node (170) and to the second write head connection node (172), wherein the first write head connection node (170) is adapted to produce a first write signal, wherein the second write head connection node (172) is adapted to produce a second write signal, wherein the current and the additional current are adapted to establish a voltage across the first write head connection node (170) and the second write head connection node (172), wherein the voltage is adapted to be pulled toward a first polarity based on the first write signal and toward a second polarity based on the second write signal, and wherein the voltage pulled toward the first polarity and the voltage pulled toward the second polarity are substantially centered about a common mode voltage.

7 Claims, 4 Drawing Sheets

HARD DISK DRIVE PREAMPLIFIER WRITE DRIVER

FIELD OF THE INVENTION

The present invention relates to inductive line drivers and, more particularly, to a differential thin-film inductive-write driver for use with a hard disk drive (HDD) preamplifier.

BACKGROUND OF THE INVENTION

The interconnecting leads between preamplifiers and read/write heads in hard disk drive devices are spaced very close together, often within a few mils of each other. The read sensors consist of very sensitive magnetoresistive material that cannot tolerate excessive voltages. In contrast, the write element consists of a thin-film inductor which requires large sub-nanosecond voltage swings for high data rate systems. Because of the close spacing of the writer and the reader, an asymmetrical voltage swing provided to the write head can couple into and damage the adjacent read element.

Prior art apparatuses for use in applying write signals for driving a write head to effect writing information to a memory device, such as write driver preamplifiers, are often not designed to effect symmetrical voltage swing during the write current reversal period. Write current reversal is commonly employed to differentiate between digital symbols (e.g., a "1" and a "0") in writing information to a memory device. Any voltage asymmetry in carrying out write current reversal will result in energy coupling into the adjacent reader(s), and can damage or destroy the sensitive read element(s). Read elements and write elements are commonly situated in very close proximity in read/write heads associated with storage mediums such as HDD devices.

The coupling current can be modeled by:

$$I = C \frac{dV}{dt} \quad (1)$$

Where, C is the average capacitance from the writer to the reader, dV is the asymmetrical voltage, and dt is the net change in time.

From Eqn. (1) one can observe that the coupling current will increase when the spacing between traces is decreased ((i.e., when capacitance is increased), when the writer voltage is asymmetric (i.e., when dV is increased), or when the switching speed is increased (i.e., when dt is decreased).

Such prior art apparatuses further attempt to provide symmetrical voltage swing by biasing the common-mode write voltage about mid supply for a single write digital-to-analog converter (DAC) setting. Therefore, the writer's output common-mode will vary with the programmed write current and the writer's voltage swing will be symmetric for only one programmed setting. Further limitations of these prior art apparatuses include the difficulty in programming the mid-supply voltage which is typically only 1 bit programmable.

It is therefore desirable for the present invention to overcome the aforementioned problems and limitations associated with the prior art apparatuses that apply write signals to drive a write head for writing information to a memory device.

SUMMARY OF THE INVENTION

The present invention achieves technical advantages as a HDD preamplifier write driver that overcomes the problems and limitations associated with the prior art apparatuses. The present invention moves the common-mode voltage of the writer's output inversely proportional to the programmed write current. As such, the common-mode voltage is fixed independent of the programmed write current. Further, the present invention provides more constant overshoot independent of the programmed write current.

In one embodiment of the present invention, an apparatus comprises a current directing circuit comprising: a first write head connection node, and a second write head connection node, wherein the current directing circuit is adapted to provide current to the first write head connection node and to the second write head connection node. The apparatus further comprises a common mode generator, coupled to the current directing circuit, adapted to provide additional current to the first write head connection node and to the second write head connection node, wherein the first write head connection node is adapted to produce a first write signal, wherein the second write head connection node is adapted to produce a second write signal, wherein the current and the additional current are adapted to establish a voltage across the first write head connection node and the second write head connection node, wherein the voltage is adapted to be pulled toward a first polarity based on the first write signal and toward a second polarity based on the second write signal, and wherein the voltage pulled toward the first polarity and the voltage pulled toward the second polarity are substantially centered about a common mode voltage.

In another embodiment of the present invention, a preamplifier comprises a common mode generator, an H-bridge circuit, a current mirror coupled to the common mode generator and to the H-bridge circuit, an overshoot system coupled to the current mirror and the H-bridge circuit, a first write head connection node adapted to produce a first write signal, wherein the first write head connection node is coupled to the H-bridge circuit, and a second write head connection node adapted to produce a second write signal, wherein the second write head connection node is coupled to the H-bridge circuit, wherein the common mode generator is adapted to provide current, wherein the current is adapted to establish a voltage across the first write head connection node and the second write head connection node, wherein the voltage is adapted to be pulled toward a first polarity based on the first write signal and toward a second polarity based on the second write signal, and wherein the voltage pulled toward the first polarity and the voltage pulled toward the second polarity are substantially centered about a common mode voltage.

In a further embodiment of the present invention, a method for producing write signals comprises receiving current from a current source at a first system when the current source is not operating at a maximum current output, supplying the current from the first system to a second system, decreasing (or maintaining) a voltage level at a transistor in the second system based on the supplied current, decreasing (or maintaining) the bias point of the transistor, decreasing a voltage level at a write connection node coupled to the transistor based on the decreased bias point, and maintaining a substantially common voltage for positive excursions and negative excursions of a write signal at the write connection node based on the decreased voltage level at the write connection node.

DETAILED DESCRIPTION OF THE INVENTION

Figure 1:
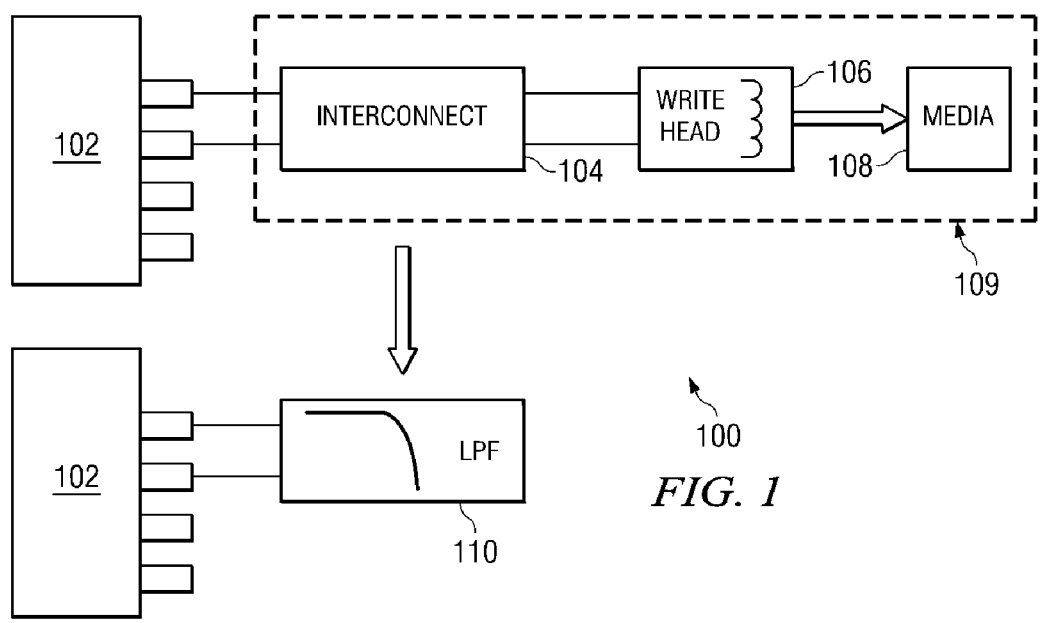
FIG. 1 is a schematic diagram illustrating modeling of a thin film inductive write driver system as a low pass filter in accordance with an exemplary embodiment of the present invention.

FIG. 1 is a schematic diagram illustrating modeling of a thin film inductive write driver system as a low pass filter. In FIG. 1, a write driver system 100 includes a preamplifier 102 coupled with an interconnect structure 104. Interconnect structure 104 typically includes lead wires extending from preamplifier 102 along an extended arm reaching adjacent a magnetic storage disk (not shown in FIG. 1) to a write head 106. Write head 106 is typically suspended on the extended arm that supports interconnect structure 104 in close proximity with media 108. Media 108 is typically a magnetic storage disk.

Components contained within dotted line box 109 may be modeled as a low pass filter (LPF) 110 coupled with preamplifier 102. Low pass filter 110 is configured to pass signals having frequencies below a predetermined frequency value and inhibit passing of signals having frequencies above the predetermined frequency value.

Figure 2:
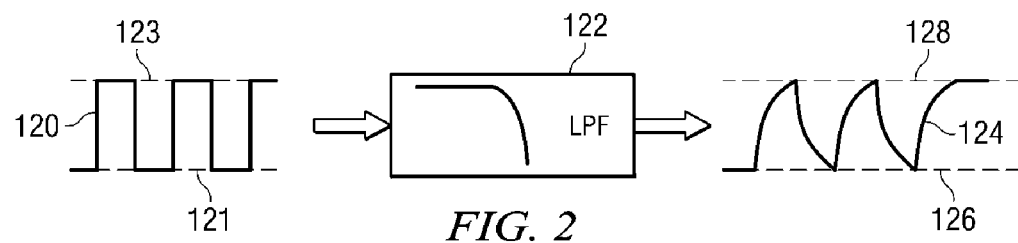
FIG. 2 is a schematic diagram illustrating how a low pass filter affects traversing signals in accordance with an exemplary embodiment of the present invention.

FIG. 2 is a schematic diagram illustrating how a low pass filter affects traversing signals. In FIG. 2, an input signal 120 is input to a low pass filter 122. Input signal 120 varies between an input signal minimum 121 and an input signal maximum 123. Low pass filter 122 presents an output signal 124. Output signal 124 has a relatively slow rise time from output signal minimum 126 and output signal maximum 128. Similarly, output signal 124 has a relatively slow fall time from output signal maximum 128 to output signal minimum 126. Slow rising and falling result in transitions or excursions of output signal 124 between output signal minimum 126 and output signal maximum 128 occupying longer time intervals than would be the case if rise times and fall times were shorter. If signal transitions or excursions occurred more quickly, more data could be transferred in a given time interval than can be transferred when rise times and fall times are slower.

Figure 3:
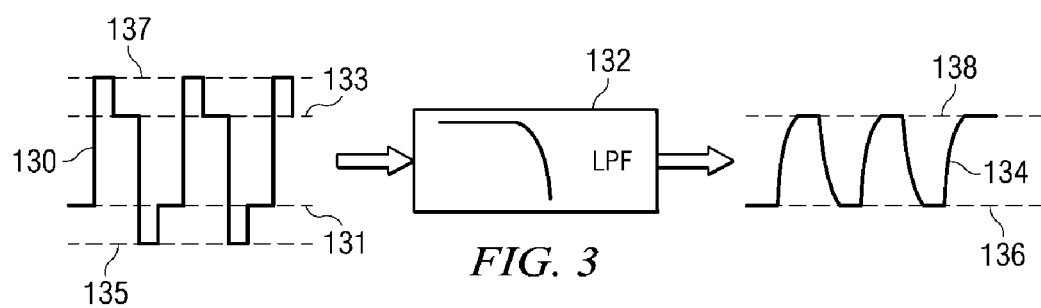
FIG. 3 is a schematic diagram illustrating how a signal overshoot affects the operation of a low pass filter in accordance with an exemplary embodiment of the present invention.

FIG. 3 is a schematic diagram illustrating how a signal overshoot affects the operation of a low pass filter. In FIG. 3, an input signal 130 is input to a low pass filter 132. An overshoot characteristic is introduced to input signal 130 so that input signal 130 varies between an input signal minimum 135 and an input signal maximum 137. Input signal limits 135, 137 are beyond the nominal signal limits 131, 133 that would be associated with input signal 130 without an overshoot characteristic imposed. Low pass filter 132 presents an output signal 134. Output signal 134 has a relatively faster rise time (compared with rise time for output signal 124; FIG. 2) from output signal minimum 136 and output signal maximum 138. Similarly, output signal 134 has a relatively faster fall time (compared with rise time for output signal 124; FIG. 2) from output signal maximum 138 to output signal minimum 136. Faster rising and falling times result in transitions or excursions of output signal 134 between output signal minimum 136 and output signal maximum 138 occupying shorter time intervals. Because signal transitions or excursions occur more quickly, more data can be transferred in a given time interval than can be transferred when rise times and fall times are slower.

Faster rising and falling of signals to a write head in a storage system is manifested in increased density of stored bits. Write systems therefore preferably provide current overshoot characteristics to aid in quickly reversing current direction through a write head to reverse flux direction intersected by the storage medium (e.g., a magnetic disk) for writing information to the storage medium (e.g., "1"s and "0"s). Providing current overshoot characteristics also sharpens transition edges, thereby permitting reliable increased density writing of information to the storage medium.

Figure 4:
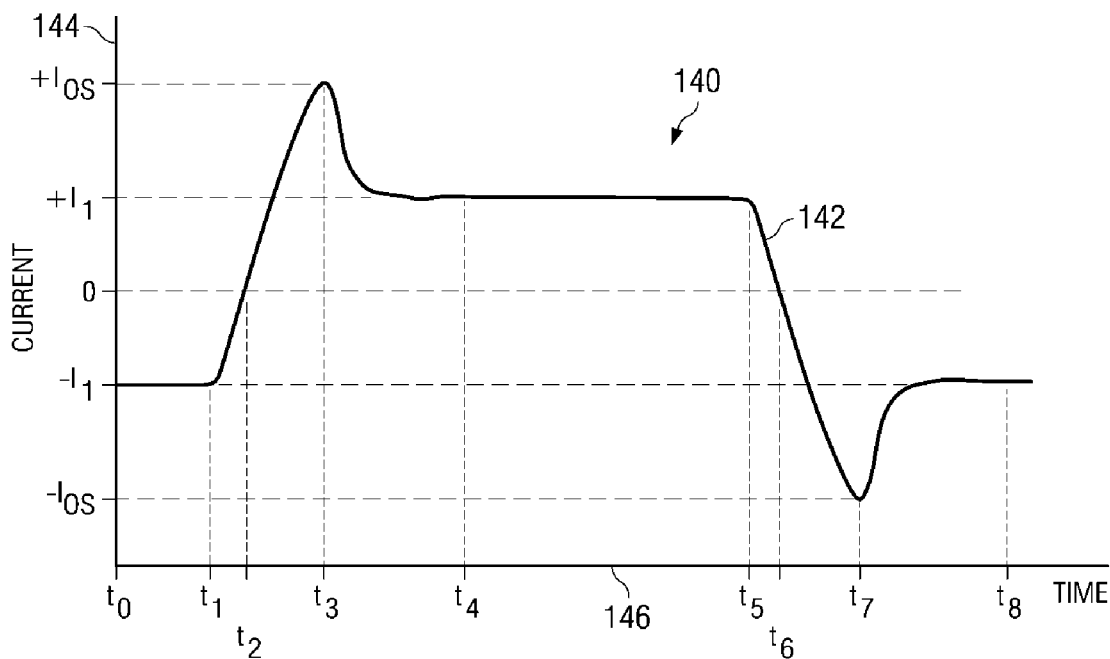
FIG. 4 is a graphic plot illustrating a desired write current waveform as a function of time in accordance with an exemplary embodiment of the present invention.

FIG. 4 is a graphic plot illustrating a desired write current waveform as a function of time. In FIG. 4, a graphic plot 140 presents a curve 142 representing current through a write head is plotted according to a first (current) axis 144 as a function of time according to a second axis 146. Curve 142 begins at a time $t_o$ at a current level of $-I_1$. Current level $-I_1$ is a current level that indicates a digital character (e.g., a "1" or a "0") for storage in a medium such as a magnetic storage disk (not shown in FIG. 4). At a time $t_1$ curve 142 increases and passes zero at a time $t_2$. Curve 142 continues to increase until it reaches a value of $+I_{OS}$ at a time $t_3$. Current level $+I_{OS}$ is the positive overshoot current limit or peak overshoot of curve 142. Curve 142 rapidly declines in value after time $t_3$ and approaches a current level $+I_1$. Curve 142 settles out at current level $+I_1$ substantially at time $t_4$. Current level $+I_1$ is a current level that indicates a digital character (e.g., a "1" or a "0") for storage in a medium such as a magnetic storage disk (not shown in FIG. 4). At time $t_5$ curve 142 decreases and passes zero at a time $t_6$. Curve 142 continues to decrease until it reaches a value of $-I_{OS}$ at a time $t_7$. Current level $-I_{os}$ is the negative overshoot current limit or peak undershoot of curve 142. Curve 142 rapidly increases in value after time $t_7$ and approaches a current level $-I_1$. Curve 142 settles out at current level $-I_1$ substantially at time $t_8$. Preferably curve is symmetrical so that there is no net positive or negative current. That is, preferably magnitude $|+I_{OS}|$ is equal with magnitude $|+I_{OS}|$, and interval $(t_1-t_4)$ is equal with interval $(t_5-t_8)$.

Figure 5:
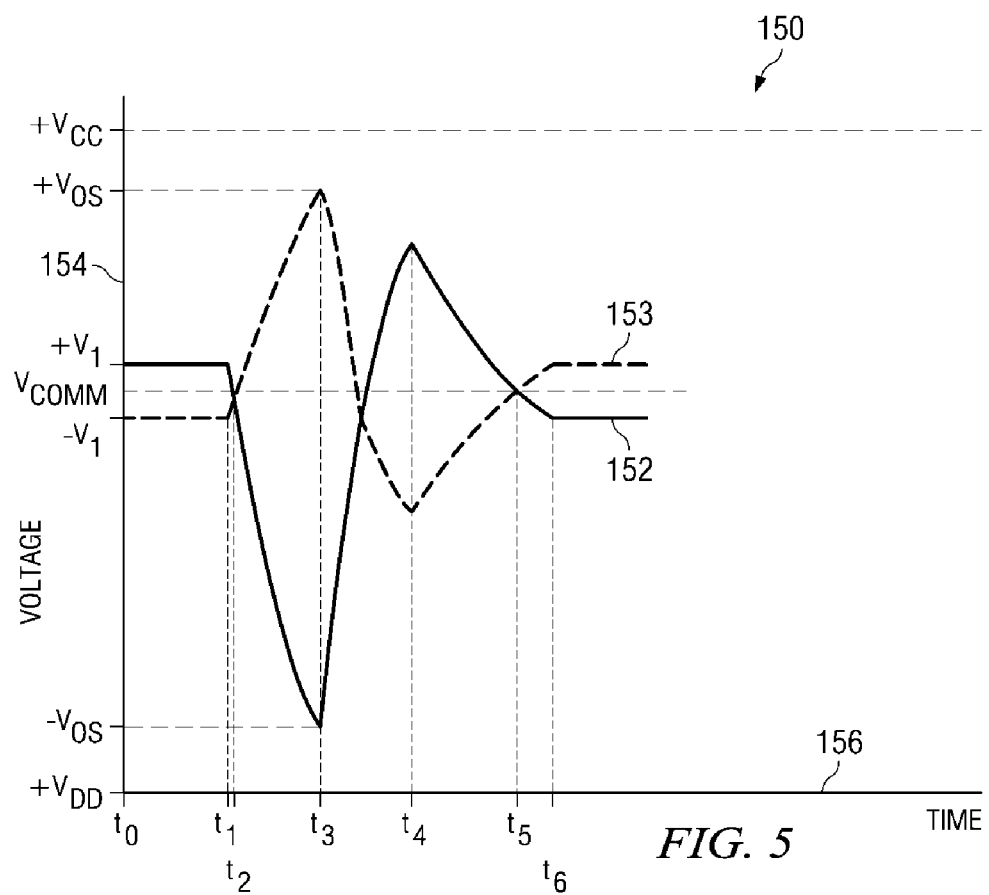
FIG. 5 is a graphic plot illustrating voltage characteristics across a write head as a function of time that are appropriate for presenting the desired current waveform illustrated in FIG. 4 in accordance with an exemplary embodiment of the present invention.

FIG. 5 is a graphic plot illustrating voltage characteristics across a write head as a function of time that are appropriate for presenting the desired current waveform illustrated in FIG. 4. In FIG. 5, a graphic plot 150 presents curves 152, 153 representing voltages present at respective connection terminals of a write head that provide the desired write currents (e.g., curve 140; FIG. 4). Curves 152, 153 are plotted according to a first (voltage) axis 154 as a function of time according to a second axis 156. Curve 152 represents voltage present at a first terminal of a write head and begins at a time $t_0$ at a voltage level of $+V_1$. Curve 153 represents voltage present at a second terminal of the write head and begins at a time $t_0$ at a voltage level of $-V_1$. Curves 152, 153 represent voltage potentials at each of two ends of a write head that cooperate to establish a current through the write head (e.g., curve 140; FIG. 4). At a time $t_1$ curve 152 decreases and passes the common-mode point at a time $t_2$. At a time $t_1$ curve 153 increases and passes the common-mode point at time $t_2$. Polarity of the current through the write head is determined by polarities of voltages at terminals of the write head. Thus, cur-rent through the write head will proceed in a first direction (i.e., have a first polarity) when curve 152 is at potential $+V_1$ and curve 153 is at potential $-V_1$ as during the interval $t_0$–$t_2$. The relative polarities of curves 152, 153 during interval $t_0$–$t_2$ will produce a write current, for example, of –11 as indicated during interval $t_0$–$t_1$ in FIG. 4.

Curve 152 continues to decrease until it reaches a value of $V_{OS}$ at a time $t_3$. Curve 153 continues to increase until it reaches a value of $+V_{OS}$ at time $t_3$. Voltage level $-V_{OS}$ is the negative overshoot voltage limit of curve 152. Voltage level $+V_{OS}$ is the positive overshoot voltage limit of curve 153. During the interval $t_2$–$t_3$ current (e.g., curve 140; FIG. 4) through the write head approaches zero and reaches zero at time $t_3$. Curve 152 rapidly increases in value after time $t_3$ and reaches a maximum excursion locus at time $t_4$. Curve 153 decreases in value after time $t_3$ and reaches a minimum excursion locus at time $t_4$. Current through the write head has passed its peak overshoot current limit (either $+1_{os}$ or $-I_{os}$), depending upon the relative polarities of curves 152, 153) during the interval $t_3$–$t_4$.

Curve 152 decreases after time $t_4$ and settles out at voltage $-V_1$ at time $t_6$. Curve 153 increases after time $t_4$ and settles out at voltage $+V_1$ at time $t_6$. Peak undershoot of current through the write head occurs at time $t_5$ when curves 152, 153 cross. Current through the write head during interval to $t_0$–$t_1$ flows in the opposite direction of current through the write head following time $t_6$ because the relative polarities of curves 152, 153 are reversed during those times.

During interval $t_0$–$t_1$ and after time $t_6$ curves 152, 153 are substantially symmetrical about a common mode voltage $V_{comm}$. It is preferred that voltage represented by curve 152 ($V_{152}$) and voltage represented by curve 153 ($V_{153}$) be symmetrical about common mode voltage $V_{COMM}$ so that preferably magnitude $|V_{152}|$ is equal with magnitude $|V_{153}|$ in any selected time interval. When such symmetry is achieved, coupling between components in a write system (e.g., coupling with adjacent read elements) may be avoided.

Sometimes a system is skewed toward the top rail (also referred to as upper supply voltage; e.g., $V_{CC}$ in FIG. 5) or toward the bottom rail (also referred to as lower supply voltage; e.g., $V_{EE}$ in FIG. 5) and "runs out of room" in its signal variance while seeking desired symmetry. This sometimes occurs because common mode voltage $V_{COMM}$ (i.e., the common voltage about which the signal variations are desired to be symmetrical) is too high or too low. When common mode voltage $V_{COMM}$ is too close to the top rail, for example, a system may tend to generate voltages that encounter the top rail, limiting the magnitude of signal excursion in the positive direction (while not affecting signal excursions in the negative direction), thereby experiencing asymmetry. Similarly, one may find that common mode voltage $V_{COMM}$ is skewed toward a lower value so that a system tends to generate voltages that encounter the bottom rail and thereby experience asymmetry.

A manufacturer of a preamplifier for use with a read-write storage system (e.g., a magnetic disk storage system) preferably designs a preamplifier that can accommodate a variety of operating conditions and parameters that may be presented by different system designs by different customers. Accordingly it is advantageous for a given preamplifier design to have programmable bottom end characteristics—such as programmable magnitude and programmable duration of boost or overshoot toward a negative direction for a voltage waveform for a writer head. Similarly, it is advantageous for a given preamplifier to have programmable top end characteristics—such as programmable magnitude and programmable duration of boost or overshoot toward a positive direction for a voltage waveform for a writer head. Having both top and bottom boost or overshoot programmable permits a preamplifier to accommodate a wide range of operating characteristics that may be encountered in various storage systems in which the preamplifier may be employed. In order to design a device that can be used with a variety of products for a variety of customers, it is advantageous for a system to provide some adjustability to a customer in designing what value is assigned for common mode voltage $V_{COMM}$. It is advantageous for a system to provide a capability to adjust the value of common mode voltage $V_{COMM}$ to permit a designer to ensure that sufficient room is left to avoid crowding the top rail or the bottom rail during operation.

Figure 6A:
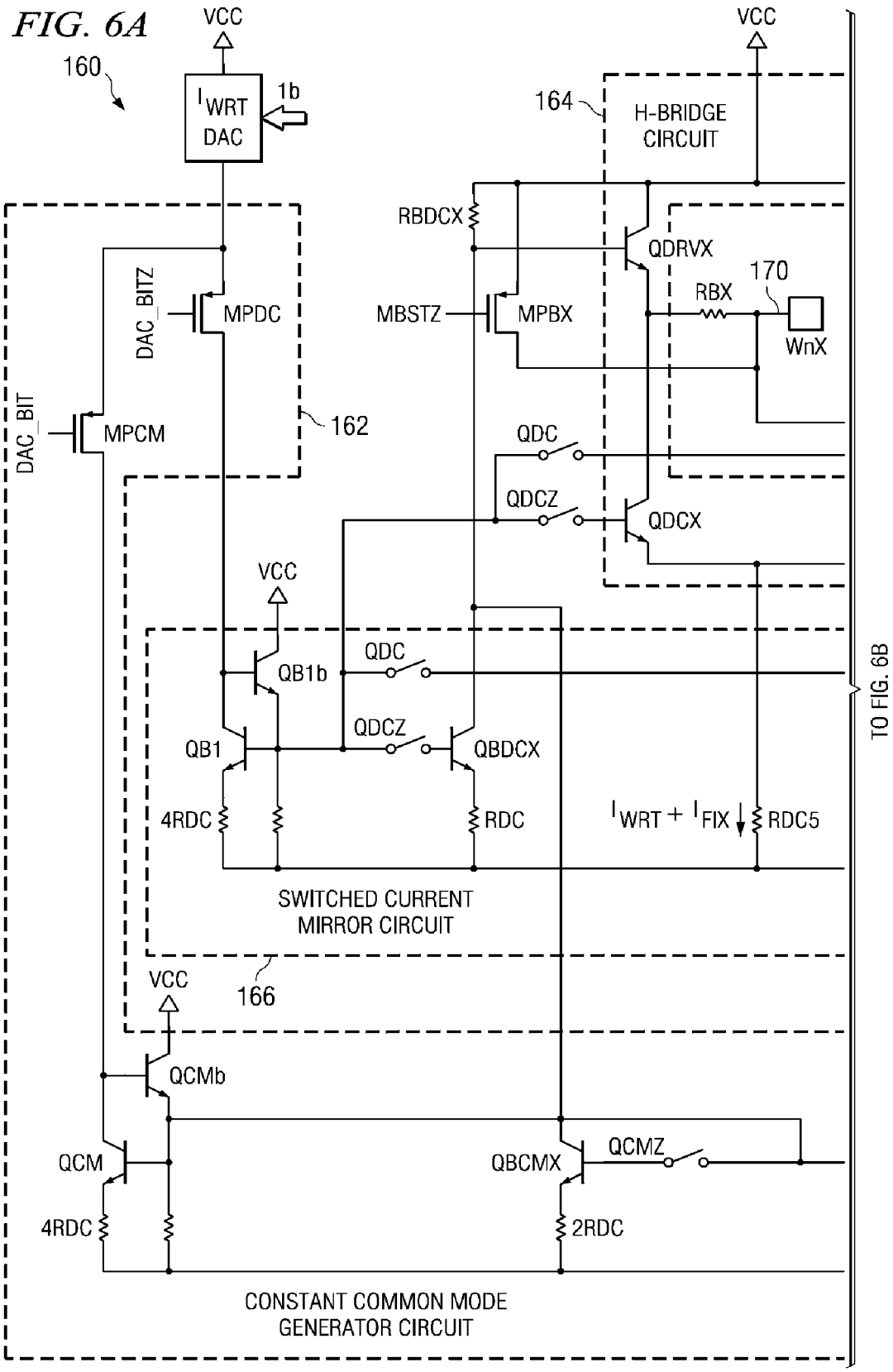
FIG. 6 is a schematic diagram illustrating the preferred embodiment of the apparatus of the present invention.
Figure 6B:
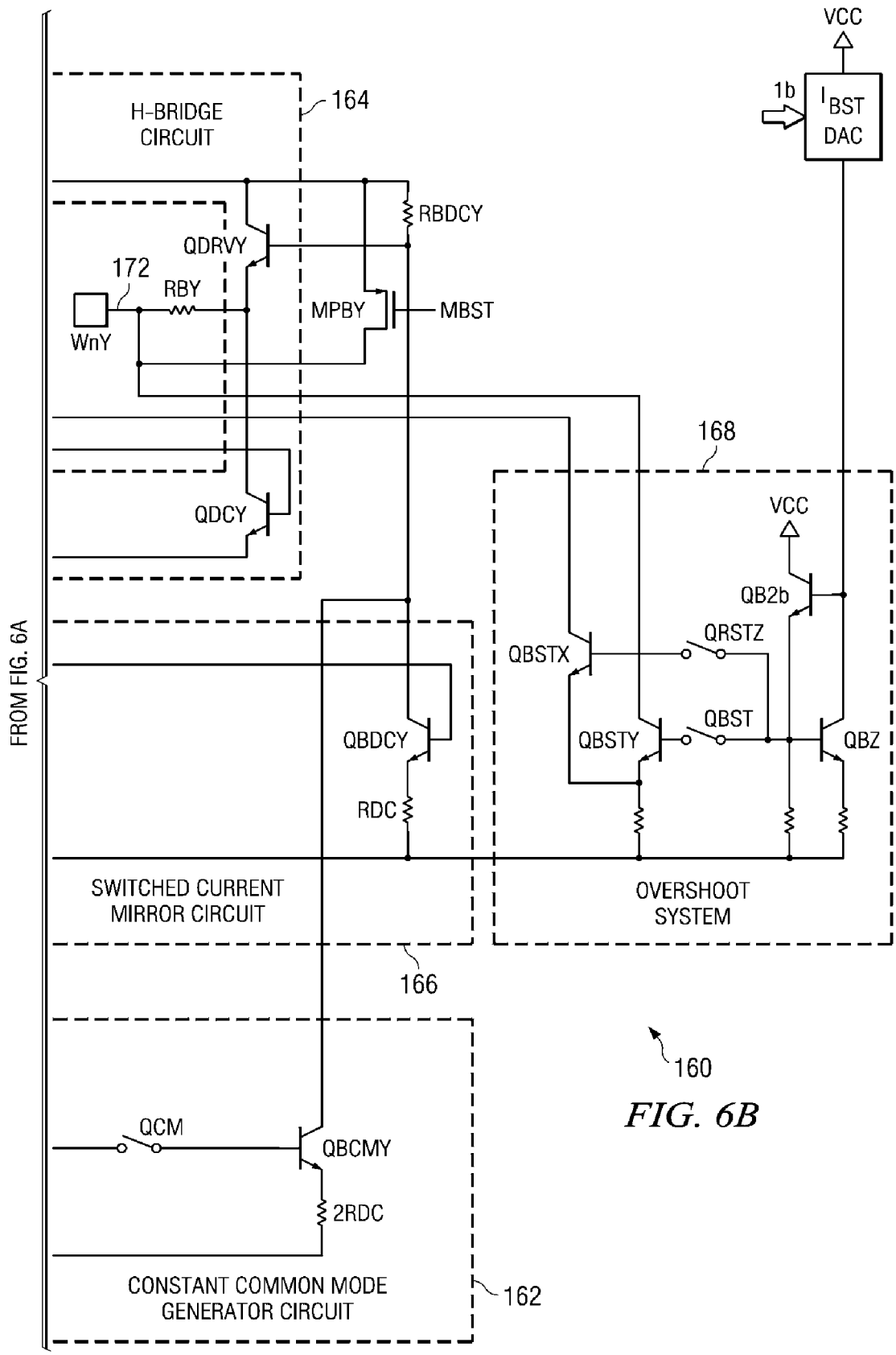

FIG. 6 is a schematic diagram illustrating the preferred embodiment of the apparatus or preamplifier 160 of the present invention. The apparatus 160 includes a constant common mode generator circuit 162, an H-bridge circuit 164, a switched current mirror circuit 166, and an overshoot circuit 168.

H-Bridge Circuit Description

The H-bridge circuit 164 includes transistors QDRVX and QDCX coupled at a first common locus or node, and transistors QDRVY and QDCY coupled at a second common locus or node. Write head connection node WnX is connected to the common locus of QDRVX and QDCX by series bias resistor RBX. Write head connection node WnY is connected to the common locus of QDRVY and QDCY by series bias resistor RBY. A first supply voltage Vcc is applied to transistor QDRVX at its collector and is applied to transistor QDRVY at its collector. Transistors QDCX and QDCY are connected to a second supply voltage Vee through a shared bias resistor RDCS.

Switched Current Mirror Description

The switched current mirror 166 is composed of current reference transistors QB1 and QB1b and mirror transistors QBDCX and QBDCY. Switches QDC and QDCZ are connected at a common locus to the output of the current mirror reference composed of transistors QB1 and QB1b. The base of transistor QBDCX is connected to switch QDCZ and the base of transistor QBDCY is connected to switch QDC. The current mirror reference transistors QB1 and QB1b are connected to digital-to-analog converter IWRT by transistor MPDC. The reference current for transistors QB1 and QB1b is provided by digital-to-analog-converter IWRT.

When switches QDC are closed, both transistors QDCY and QBDCY will be turned on to conduct. Rendering transistor QDCY conductive will connect the common locus of QDCY, QDRVY and RBY to second supply voltage VEE. Rendering transistor QBDCY conductive will decrease the base voltage of transistor QDRVY, thereby rendering transistor QDRVY partially nonconductive. In this configuration, current will be allowed to flow from write head connection node WnY to second supply VEE by passing through transistor QDCY. At the same time that switches QDC are closed, switches QDCZ will be open. This will render transistors QDCX and QBDCX nonconducting. Rendering transistor QDCX nonconductive will disconnect the common locus of transistor QDRVX, resistor RBX and transistor QDCX from second supply VEE while leaving this locus connected to first supply voltage VCC through transistor QDRVX. In this configuration, current will be supplied to the write head connection node WnX by passing through transistor QDRVX, resistor RBX, and resistor RBY from first supply VCC. Thus, when the H-bridge circuit is configured in the manner described, write current will be caused to flow into write head connection node WnX and out of write head connection node WnY. This situation may exist, for example, when a write signal establishes a positive voltage excursion across write head connection nodes WnX and WnY from common mode voltage.

The write circuit operates in a substantially similar fashion to the exemplary configuration when switches QDCZ are closed and switches QDC are open. This situation may exist, for example, when a write signal establishes a negative voltage excursion across write head connection nodes WnX and WnY from common mode voltage.

It is the alternate closing and opening of switches QDC and QDCZ that effects writing of data to a hard disk in a disk drive storage device.

Overshoot System Description

The overshoot system 168 includes switches QBSTZ and QBST, transistors QB2 and QB2*b* and transistors QBSTX and QBSTY. Transistors QB2 and QB2*b* are configured as a current mirror with transistors QBSTX and QBSTY. The reference current for transistors QB2 and QB2*b* is provided by a programmable digital-to-analog-converter IBST. In order to enhance negative excursions of signal WnX switch QBSTZ is closed, thereby turning on transistor QBSTX to conduct. Switch QBST is open so that transistor QBSTY does not conduct. Rendering transistor QBSTX conductive applies additional current from the current mirror to lower the potential at write connection locus WnX. The lowered potential at write connection locus WnX pulls down the write signal WnX, thereby boosting the bottom characteristic of write signal WnX. That is, negative excursion of write signal WnX is enhanced by the overshoot system.

In order to enhance negative excursions of signal WnY switch QBST is closed, thereby turning on transistor QBSTY to conduct. Switch QBSTZ is open so that transistor QBSTX does not conduct. Rendering transistor QBSTY conductive applies additional current from the current mirror to lower the potential at write connection locus WnY. The lowered potential at write connection locus WnY pulls down the write signal WnY, thereby boosting the bottom characteristic of write signal WnY. That is, negative excursion of write signal WnY is enhanced by the overshoot system.

The strength, or magnitude of the boost provided by the overshoot system may be adjusted by varying the current IBST provided to the current mirror by the IBST DAC.

It is important to have write voltage signals (e.g., write signals WnX, WnY) experience balanced excursions from their common mode voltage in order to reduce coupling with adjacent read elements (not shown in Fig.). In order to enhance positive excursion of write signal WnX control signal MBSTZ gates transistor MPBX to conduct. Transistor MPBY is not gated and therefore does not conduct. Rendering transistor MPBX conductive applies first supply voltage VCC to raise potential at write connection locus WnX. The raised potential at write connection locus WnX pulls up write signal WnX toward first supply voltage VCC, thereby boosting the top characteristic of write signal WnX. That is, the positive excursion of write signal WnX is enhanced by rendering transistor MPBX conductive. In order to enhance positive excursion of write signal WnY control signal MBST gates transistor MPBY to conduct. Transistor MPBX is not gated and therefore does not conduct. Rendering transistor MPBY conductive applies first supply voltage VCC to raise potential at write connection locus WnY. The raised potential at write connection locus WnY pulls up write signal WnY toward first supply voltage VCC, thereby boosting the top characteristic of write signal WnY. That is, the positive excursion of write signal WnY is enhanced by rendering transistor MPBY conductive.

Constant Common Mode Generator Description

The constant common mode generator 162 consists of a current mirror system composed of reference transistors QCM and QCMb and mirror transistors QBCMX and QBCMY. The current mirror reference transistors QCM and QCMb are connected to digital-to-analog converter IWRT by transistor MPCM. The current in the current mirror reference transistors QCM and QCMb may be supplied by digital-to-analog converter IWRT. Transistors QBCMX and QBCMY are connected at a common locus to the output of the current mirror reference composed of transistors QCM and QCMb.

Control signal DAC_BIT gates transistor MPCM to conduct when the DAC is not operating at its maximum current output. When signal DAC_BIT is applied to the gate of transistor MPCM this transistor will be rendered conductive. This will allow current to flow from the DAC to the current mirror reference transistors QCM and QCMb.

When switch QCMZ is closed transistor QBCMX will conduct current proportional to the current in the current mirror reference transistors QCM and QCMb. This current through QBCMX will cause the voltage at the base of transistor QDRVX to be decreased. This voltage decrease at the base of transistor QDRVX will then decrease the voltage level at write connection locus WnX. This decrease in voltage at WnX may be useful in maintaining a particular center voltage for positive and negative excursions of the write signal at WnX.

When switch QCM is closed transistor QBCMY will conduct current proportional to the current in the current mirror reference transistors QCM and QCMb. This current through QBCMY will cause the voltage at the base of transistor QDRVY to be decreased. This voltage decrease at the base of transistor QDRVY will then decrease the voltage level at write connection locus WnY. This decrease in voltage at WnY may be useful in maintaining a particular center voltage for positive and negative excursions of the write signal at WnY. The constant common mode generator will thus allow additional current to be used to effectively position and maintain the write driver's common mode voltage at a desired level.

The apparatus 160 includes the common mode generator 162, the H-bridge circuit 164, the current mirror 166 coupled to the common mode generator and to the H-bridge circuit, and the overshoot system 168 coupled to the current mirror and the H-bridge circuit. A first write head connection node (for example, node 170) is adapted to produce a first write signal, wherein the first write head connection node is coupled to the H-bridge circuit, and a second write head connection node (for example, node 172) is adapted to produce a second write signal, wherein the second write head connection node is also coupled to the H-bridge circuit. The first write signal and the second write signal are received by a write head external to the preamplifier 160 via an interconnect coupled between the preamplifier and the write head (see FIG. 1).

In the apparatus 160, the common mode generator 162 is adapted to provide current, the current is adapted to establish a voltage across the first write head connection node and the second write head connection node, the voltage is adapted to be pulled toward a first polarity based on the first write signal and toward a second polarity based on the second write signal, and the voltage pulled toward the first polarity and the voltage pulled toward the second polarity are substantially centered about a common mode voltage.

A first current source (for example, the DAC IWRT) is coupled to the common mode generator 162 and supplies current (via at least one programmable current source) to the current mirror when the first current source is at a maximum level. The first current source further supplies current to the common mode generator 162 when the first current source is not at a maximum level. The current is supplied substantially equally to the first write head connection node 170 and to the second write head connection node 172 and the common mode voltage remains substantially constant.

A second current source (for example, the DAC IBST) is coupled to the overshoot system 168 which supplies current to the first write head connection node 170 and to the second write head connection node 172. The switches QCM and QCMZ of the common mode generator 162 and the switches QBST and QBSTZ of the overshoot system 168 can operate independently of one another or in conjunction with one another. For example, at least one of the common mode generator 162 switches can be off for a period of time when at least one of the overshoot system 168 switches is on. In such a situation, one of the voltage pulled toward the first polarity and the voltage pulled toward the second polarity is pulled in one of a higher and lower direction from the substantially centered common mode voltage.

The apparatus 160 can be described as comprising the common mode generator circuit 162 and a current directing circuit that includes the H-bridge circuit 164, the current mirror circuit 166, the overshoot system 168, as well as the first write head connection node 170 and the second write head connection node 172, wherein the current directing circuit is adapted to provide current to the first write head connection node and to the second write head connection node. The common mode generator 162, coupled to the current directing circuit, is adapted to provide additional current to the first write head connection node 170 and to the second write head connection node 172, wherein the first write head connection node is adapted to produce a first write signal, wherein the second write head connection node is adapted to produce a second write signal, wherein the current and the additional current are adapted to establish a voltage across the first write head connection node and the second write head connection node, wherein the voltage is adapted to be pulled toward a first polarity based on the first write signal and toward a second polarity based on the second write signal, and wherein the voltage pulled toward the first polarity and the voltage pulled toward the second polarity are substantially centered about a common mode voltage.

The current and the additional current from the apparatus 160 are provided contemporaneously or independently. Further, the voltage across the first write head connection node (for example, node 170) is pulled toward a positive supply voltage and the voltage across the second write head connection node (for example, node 172) is pulled toward a ground potential. Also, the voltage is adapted to be pulled toward the first polarity for a first duration, and the voltage is adapted to be pulled toward the second polarity for a second duration, wherein the first duration and the second duration are unequal, are substantially equal, and/or overlap.

The present invention also includes a method for producing write signals. The method comprises receiving current from a current source (such as the DAC IWRT) at a first system (such as the common mode generator 162) when the current source is not operating at a maximum current output, supplying the current from the first system to a second system (such as any combination of the H-bridge circuit 164, the current mirror circuit 166, the overshoot system 168, the first write head connection node 170 and the second write head connection node 172), decreasing a voltage level at a transistor in the second system based on the supplied current, decreasing a voltage level at a write connection node 170 or 172 coupled to the transistor based on the decreased current, and maintaining a substantially common voltage for positive excursions and negative excursions of a write signal at the write connection node based on the decreased voltage level at the write connection node.

The method further comprises receiving current from the current source at the second system when the current source is not operating at the maximum current output or when the current source is operating at a maximum current output, and further comprises contemporaneously receiving the current at the first system and receiving the current at the second system, as well as receiving the current from the current source at the transistor.

Although an exemplary embodiment of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, a greater or lesser amount of gates may be implemented in the common mode generator 162 and/or in the overshoot system 168.

What is claimed is:

1. A preamplifier, comprising:
   a common mode generator;
   an H-bridge circuit;
   a current mirror coupled to the common mode generator and to the H-bridge circuit;
   an overshoot system coupled to the current mirror and the H-bridge circuit;
   a first write head connection node adapted to produce a first write signal, wherein the first write head connection node is coupled to the H-bridge circuit; and
   a second write head connection node adapted to produce a second write signal, wherein the second write head connection node is coupled to the H-bridge circuit;
   wherein the common mode generator is adapted to provide current;
   wherein the current is adapted to establish a voltage across the first write head connection node and the second write head connection node;
   wherein the voltage is adapted to be pulled toward a first polarity based on the first write signal and toward a second polarity based on the second write signal; and
   wherein the voltage pulled toward the first polarity and the voltage pulled toward the second polarity are substantially centered about a common mode voltage,
   a first current source coupled to the common mode generator,
   wherein the first current source supplies current to the current mirror when the first current source is at a maximum level.

2. The preamplifier of claim 1, wherein the first write signal and the second write signal are received by a write head external to the preamplifier via an interconnect coupled between the preamplifier and the write head.

3. A preamplifier, comprising:
a common mode generator;
an H-bridge circuit;
a current mirror coupled to the common mode generator and to the H-bridge circuit;
an overshoot system coupled to the current mirror and the H-bridge circuit;
a first write head connection node adapted to produce a first write signal, wherein the first write head connection node is coupled to the H-bridge circuit; and
a second write head connection node adapted to produce a second write signal, wherein the second write head connection node is coupled to the H-bridge circuit;
wherein the common mode generator is adapted to provide current;
wherein the current is adapted to establish a voltage across the first write head connection node and the second write head connection node;
wherein the voltage is adapted to be pulled toward a first polarity based on the first write signal and toward a second polarity based on the second write signal; and
wherein the voltage pulled toward the first polarity and the voltage pulled toward the second polarity are substantially centered about a common mode voltage,
a first current source coupled to the common mode generator,
wherein the first current source supplies current to the common mode generator when the first current source is not at a maximum level.

4. The preamplifier of claim 3, wherein the current is supplied substantially equally to the first write head connection node and to the second write head connection node.

5. The preamplifier of claim 4, wherein the common mode voltage remains substantially constant when the current is supplied substantially equally to the first write head connection node and to the second write head connection node.

6. A preamplifier, comprising:
a common mode generator;
an H-bridge circuit;
a current mirror coupled to the common mode generator and to the H-bridge circuit;
an overshoot system coupled to the current mirror and the H-bridge circuit;
a first write head connection node adapted to produce a first write signal, wherein the first write head connection node is coupled to the H-bridge circuit; and
a second write head connection node adapted to produce a second write signal, wherein the second write head connection node is coupled to the H-bridge circuit;
wherein the common mode generator is adapted to provide current;
wherein the current is adapted to establish a voltage across the first write head connection node and the second write head connection node;
wherein the voltage is adapted to be pulled toward a first polarity based on the first write signal and toward a second polarity based on the second write signal; and
wherein the voltage pulled toward the first polarity and the voltage pulled toward the second polarity are substantially centered about a common mode voltage,
a first current source coupled to the common mode generator,
wherein at least a portion of the common mode generator is off for a period of time when at least a portion of the overshoot system is on.

7. The preamplifier of claim 6, wherein one of the following voltages from a group comprising of: the voltage pulled toward the first polarity, and the voltage pulled toward the second polarity is pulled in one of a following direction from a group comprising of: higher, and lower, from the substantially centered common mode voltage.

* * * * *